United States Patent [19]
Morisawa et al.

[11] Patent Number: 6,137,963
[45] Date of Patent: Oct. 24, 2000

[54] VIEW FINDER DEVICE

[75] Inventors: Tahei Morisawa; Makoto Mogamiya, both of Tokyo; Sachio Hasushita, Hokkaido; Tetsuya Abe; Takayuki Sensui, both of Tokyo, all of Japan

[73] Assignee: Asahi Kogaku Kogyo Kabushiki Kaisha, Tokyo, Japan

[21] Appl. No.: 08/845,163

[22] Filed: Apr. 25, 1997

[30] Foreign Application Priority Data

| Apr. 26, 1996 | [JP] | Japan | ................................... 8-131049 |
| Jan. 9, 1997 | [JP] | Japan | ................................... 9-002352 |
| Jan. 9, 1997 | [JP] | Japan | ................................... 9-002353 |

[51] Int. Cl.[7] .......................... G03B 17/50; G03B 17/48; G03B 17/02
[52] U.S. Cl. .......................... 396/429; 396/30; 396/373; 396/538
[58] Field of Search .............................. 396/30, 429, 383, 396/411, 535, 538, 373

[56] References Cited

U.S. PATENT DOCUMENTS

| 4,945,423 | 7/1990 | Takanashi et al. ...................... 358/300 |
| 5,294,990 | 3/1994 | Aoki .......................................... 348/363 |
| 5,424,156 | 6/1995 | Aoki et al. . |
| 5,467,204 | 11/1995 | Hatano et al. ........................... 358/482 |
| 5,646,927 | 7/1997 | Shimizu et al. .......................... 369/99 |
| 5,905,526 | 5/1999 | Sato .......................................... 348/96 |
| 5,913,077 | 6/1999 | Sato et al. ................................ 396/30 |

FOREIGN PATENT DOCUMENTS 5-2280   1/1993   Japan .

*Primary Examiner*—Eddie C. Lee
*Assistant Examiner*—Christopher Mahoney
*Attorney, Agent, or Firm*—Greenblum & Bernstein, P.L.C.

[57] ABSTRACT

A view finder device has a Poro prism and a first optical system facing an emergent plane of the Poro prism. The first optical system is positioned beside the Poro prism and opposite to a recording medium passage through which an electro-developing recording medium is moved. A relay optical system is provided behind the recording medium passage, so that the eye point of the view finder is separated from the first optical system. A second optical system is provided behind the relay optical system, so that the image formed by the relay optical system is observed. Since the electro-developing recording medium can be moved between the first optical system and the relay optical system, the finder optical system can be disposed at a lower position.

6 Claims, 15 Drawing Sheets

VIEW FINDER DEVICE

BACKGROUND OF THE INVENTION

1. Field of the Invention

The present invention relates to a camera using a recording medium by which an object image formed thereon is electronically developed, and more particularly, to a view finder device associated with the camera.

2. Description of the Related Art

Conventionally, as disclosed in Japanese Unexamined Patent Publication No. 5-2280 and U.S. Pat. No. 5,424,156, there is known a photographic material which is directly and electronically developed so that the developed visible image can be immediately obtained. In this specification, such a recording medium is referred to as an electro-developing recording medium, and an electronic still camera using the electro-developing recording medium is referred to as an electro-developing type camera.

The electro-developing recording type camera may be constructed in such a manner that R (red), G (green), and B (blue) images can be recorded in the electro-developing recording medium, so that a natural color image can be obtained. Thus, the electro-developing recording medium has three recording areas to record the R, G, and B images, and may be constructed to move along a predetermined line so that one of the recording areas is positioned on the optical axis of the photographing optical axis. Accordingly, the electro-developing type camera becomes bulky in order to accommodate such movable recording medium.

SUMMARY OF THE INVENTION

Therefore, an object of the present invention is to provide a view finder device where the construction allows the reduction of the size of an electro-developing type camera.

According to the present invention, there is provided a view finder device associated with a camera using an electro-developing recording medium in which an object image formed thereon is electronically developed, the electro-developing recording medium being movable along a surface thereof, the device comprising a view finder optical system.

The view finder optical system is provided with a passage through which the electro-developing recording medium can pass through, the passage being extended in a direction approximately perpendicular to the optical axis of the view finder optical system.

The other object of the present invention is to provide a view finder device where the construction allows the reduction of the size of an electro-developing type camera, without lowering the magnification of a magnifier provided in the view finder device.

According to the present invention, there is provided a view finder device provided in a camera in which a recording medium can be moved along a surface thereof, the device comprising a photographing optical system through which an object image is formed, a reflecting optical member, a Poro prism, and a first optical system.

The reflecting optical member is provided between the photographing optical system and the recording medium, so that a photographing optical axis of the photographing optical system is bent in a direction, along which the recording medium is moved, to generate a first finder optical axis. The Poro prism has a first reflecting plane bending the first finder optical axis to the object to be photographed to generate a second finder optical axis, a second reflecting plane bending the second finder optical axis in a direction which is parallel to the surface of the recording medium and is perpendicular to the moving direction of the recording medium to generate a third finder optical axis, and a third reflecting plane bending the third finder optical axis to the recording medium to generate a fourth finder optical axis which is parallel to the photographing optical axis. The first optical system is provided on the fourth finder optical axis. The first optical system is positioned to a side of the object with respect to an edge of the first reflecting plane, the edge being close to the recording medium.

Further, according to the present invention, there is provided a view finder device provided in a camera in which an object image formed by a photographing optical system is recorded on a recording medium, the device comprising a reflecting optical member, an erecting system, and a first optical system.

The reflecting optical member is provided between the photographing optical system and the recording medium, so that a photographing optical axis of the photographing optical system is bent in a direction perpendicular to the photographing optical axis to generate a first finder optical axis. The erecting system has a first reflecting plane bending the first finder optical axis to the object to be photographed to generate a second finder optical axis, a second reflecting plane bending the second finder optical axis in a direction perpendicular to a plane including the photographing optical axis and the first finder optical axis, to generate a third finder optical axis, and a third reflecting plane bending the third finder optical axis to the recording medium to generate a fourth finder optical axis which is parallel to the photographing optical axis. The first optical system is provided on the fourth finder optical axis. The first optical system is positioned to a side of the object with respect to an edge of the first reflecting plane, the edge being close to the recording medium.

Another object of the present invention is to provide a view finder device having a Poro prism placed behind the photometry sensor, so that it allows the electro-developing type camera to be compact.

According to the present invention, there is provided a view finder device in a single reflex camera in which an object image obtained by a photographing optical system is formed on a focusing plane, which is optically equivalent to an imaging plane of a recording medium on which the object image is recorded, the device comprising a first optical system through which the object image formed on the focusing plane is observed, a Poro prism, and a photometry sensor.

The Poro prism is provided between the imaging plane and the first optical system, the Poro prism having a plurality of reflecting planes which bend an optical axis of the first optical system so that the object image formed on the focusing plane is observed as an erect image. The photometry sensor is provided behind an area which is a part of an emergent plane of the Poro prism. The area is closer to a point at which the emergent plane crosses one of the reflecting planes which is positioned right before the emergent plane, relative to a light beam which passes through the emergent plane and enters the first optical system.

BRIEF DESCRIPTION OF THE DRAWINGS

The objects and advantages of the present invention will be better understood from the following description, with reference to the accompanying drawings, in which.

DESCRIPTION OF THE PREFERRED EMBODIMENTS

Figure 1:
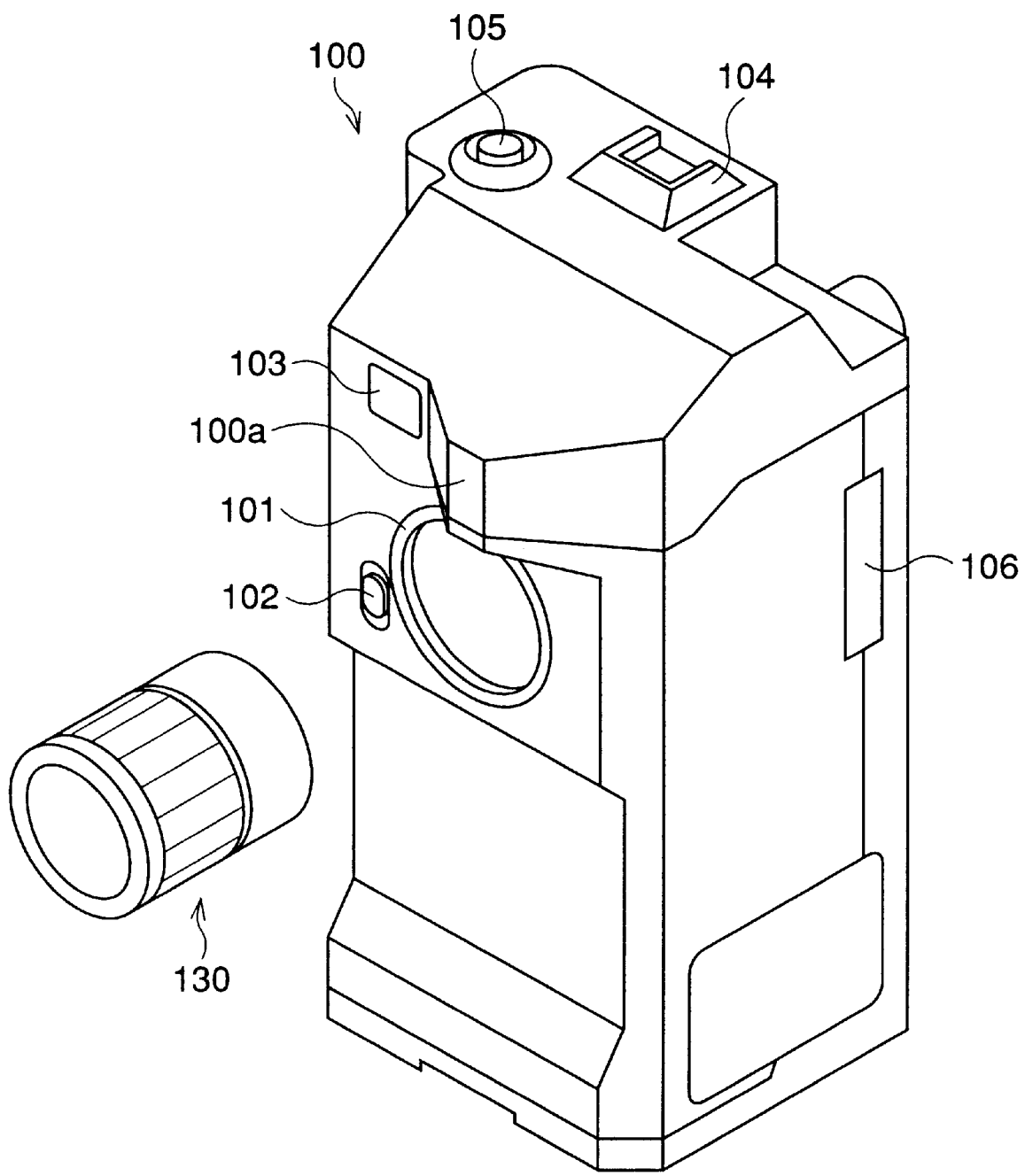
FIG. 1 is a perspective view showing an electro-developing type camera to which a first embodiment of the present invention is applied, when viewing a camera body from the front upper right direction.
Figure 2:
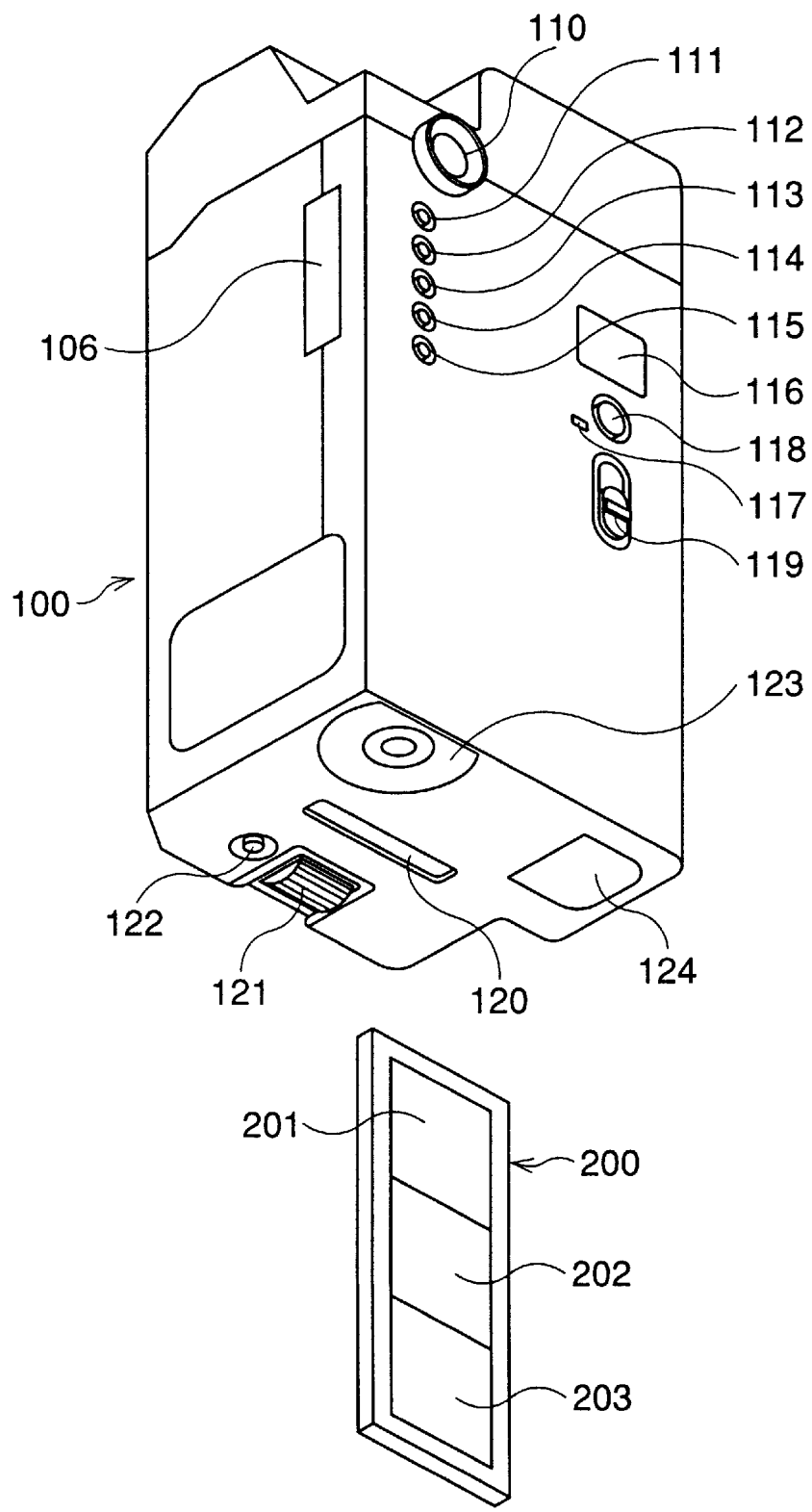
FIG. 2 is a perspective view showing the electro-developing type camera, when viewing the camera body from the rear lower left direction.

FIGS. 1 and 2 show an electro-developing type camera to which a first embodiment according to the present invention is applied. FIG. 1 is a perspective view of a camera body 100 from the front upper right direction, and FIG. 2 is a perspective view of the camera body 100 from the rear lower left direction.

A lens mount 101, in which an interchangeable lens 130, i.e., a photographing optical system is attached, is located approximately at the center portion of the front surface of the camera body 100. A removal button 102 is provided beside the lens mount 101 so that the interchangeable lens 130 can be removed from the lens mount 101 when the removal button 102 is pushed. A white balance adjusting window 103 is disposed on the left of and above the lens mount 101.

On the upper surface of the camera body 100, a flash attachment 104, on which an electronic flash can be attached, is provided and a release button 105 is provided beside the flash attachment 104. A communication connector 106 is provided on a side surface of the camera body 100, so that image data can be transmitted from the camera to an external computer (not shown) and so on.

A view finder window 110 is provided on an upper portion of a rear surface of the camera body 100. A mode select switch 111, a drive switch 112, an AV/TV switch 113, an EF switch 114, and a white balance switch 115 are provided below the view finder window 110. The mode select switch 111 is provided for setting a photographing mode of this camera. The drive switch 112 is provided for starting a self-timer, for example. The AV/TV switch 113 is used for selecting one of the aperture priority mode or the shutter speed priority mode. The EF switch 114 is used for adjusting the exposure value. The white balance switch 115 is provided for performing the white balance adjustment.

A liquid crystal display 116, which indicates an operation mode of the camera, is provided on the rear surface of the camera body 100 and beside the switches 111 through 115. A mode indicator 117 and a scan start button 118 are disposed below the liquid crystal display 116. The mode indicator 117 is lit in a different color depending upon the operation mode of the camera. The scan start button 118 is depressed when starting a scan mode in which an image recorded on a recording medium is read. A power switch 119 is provided below the scan start button 118. By operating the power switch 119, the electric power of the camera is turned ON and OFF, and the operation mode of the camera is switched between the photographing mode and the scan mode.

A slot 120 is formed on a bottom surface of the camera body 100, so that an electro-developing recording medium 200 can be inserted into or ejected from the camera body 100. A dial 121 is disposed beside the slot 120 to manually move the electro-developing recording medium 200 in the slot 120. An ejection button 122 is provided beside the dial 121, so that the electro-developing recording medium 200 can be ejected from the slot 120. A screw hole 123 is formed on the bottom surface to fix a tripod, and a lid 124 is provided to open and close a battery housing.

Figure 3:
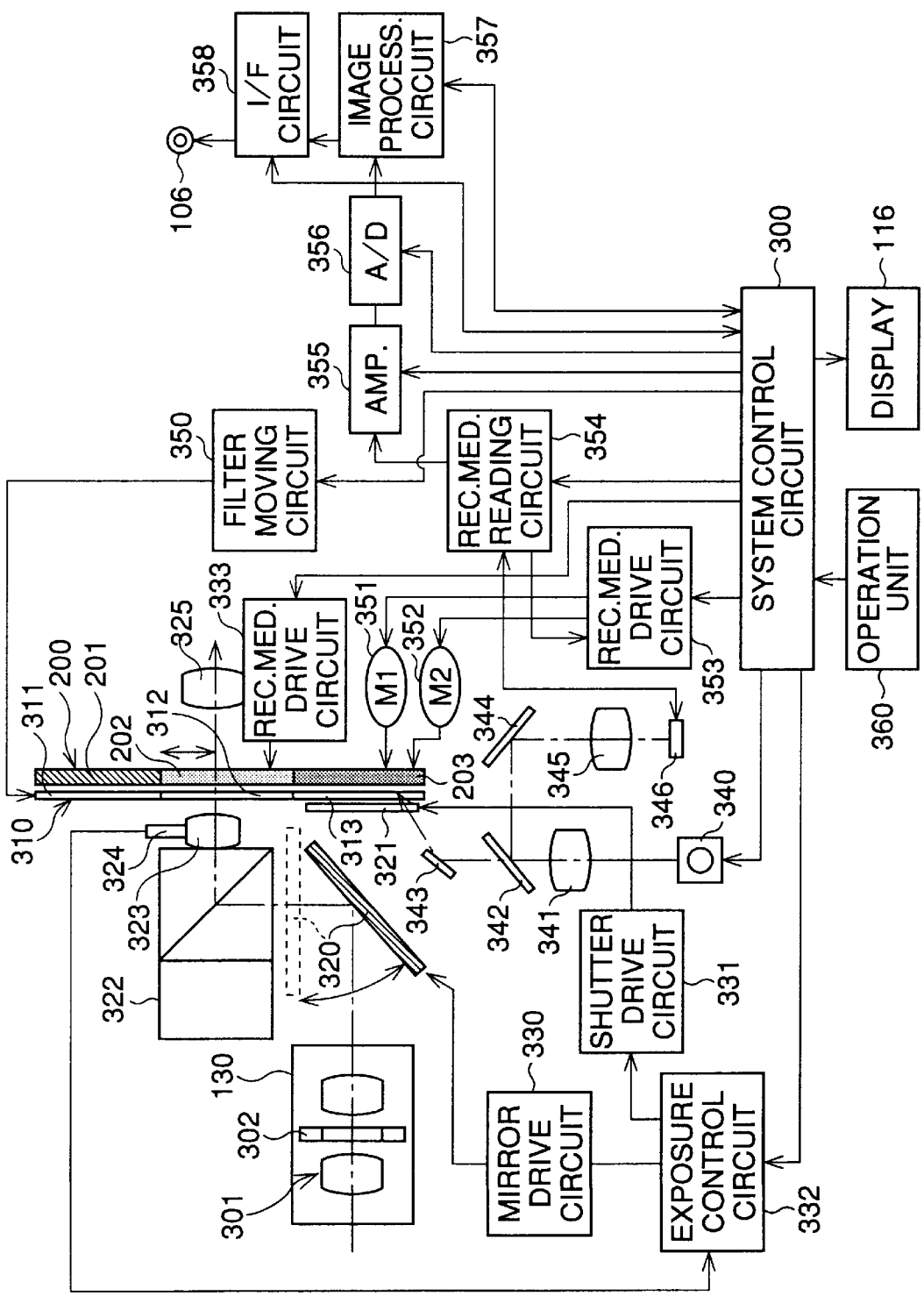
FIG. 3 is a block diagram of the electro-developing type camera shown in FIGS. 1 and 2.

FIG. 3 is a block diagram of the electro-developing type camera, in which a system control circuit 300, including a microcomputer, is mounted to control the electro-developing type camera as a whole.

A photographing optical system 301, which includes a plurality of lens groups, and an aperture 302 are housed in the interchangeable lens 130. The electro-developing recording medium 200 is disposed behind the photographing optical system 301, and a color filter 310 is provided in front of the electro-developing recording medium 200. A quick return mirror 320 is placed between the photographing optical system 301 and the color filter 310. A shutter 321 is provided between the quick return mirror 320 and the color filter 310. The shape of the aperture formed by opening the shutter 321 is a rectangle, in which a horizontal side (a direction perpendicular of the sheet of FIG. 3) is longer than a vertical side (a vertical direction in FIG. 3).

A Poro prism 322 is disposed above the quick return mirror 320. A first optical system 323 is provided close to an emergent plane of the prism 322, and a photometry sensor 324 which is a photo sensor is provided close to the first optical system 323. A relay optical system 325 is provided behind the first optical system 323 and the electro-developing recording medium 200. Namely, the finder optical system includes the prism 322, the first optical system 323, and the relay optical system 325.

The electro-developing recording medium 200 has first, second, and third recording areas 201, 202, and 203, respectively, and each area corresponds to the size of one frame of an image. The color filter 310 has an R (red) filter element 311, a G (green) filter element 312, and a B (blue) filter element 313, each having the same size as the recording areas 201, 202, and 203, i.e., corresponding to one frame of an image.

The quick return mirror 320 and the shutter 312 are driven by a mirror drive circuit 330 and a shutter drive circuit 331, respectively, which are controlled by an exposure control circuit 332. The exposure control circuit 332 is operated in accordance with a command signal outputted by the system control circuit 300.

Namely, the quick return mirror 320 is usually set to a down position (an inclining position shown by the solid line in the drawing), so that a light beam passing through the photographing optical system 301 is directed to the prism 322 to form an object image on a focusing glass (not shown in FIG. 3), and thus, an object to be photographed can be observed by the photographer through the relay optical system 325. When a photographing operation is carried out, the quick return mirror 320 is rotated upwards by the mirror drive circuit 330 and set to an up position (a horizontal position shown by the broken line in the drawing), under the control of the exposure control circuit 332, so that the light beam is directed to the electro-developing recording medium 200.

The shutter 321 is usually closed, but upon a photographing operation, the shutter 321 is opened for a predetermined period of time by the shutter drive circuit 331 under the control of the exposure control circuit 332, and thus, the light beam passing through the photographing optical system 301 enters a light receiving surface of the electro-developing recording medium 200, thus forming a two-dimensional image thereon.

An electric voltage is applied to the electro-developing recording medium 200 under the control of a recording medium drive circuit 333. By exposing the electro-developing recording medium 200 while applying the voltage, an image formed by the photographing optical system 301 is developed on the electro-developing recording medium 200 as a visible image. Note that the recording medium drive circuit 333 is operated in accordance with a command signal outputted by the system control circuit 300.

A light source 340 having, for example a photodiode (LED), a collimating lens 341, and first and second mirrors 342 and 343 are provided in front of the color filter 310 and the electro-developing recording medium 200 and below the shutter 321. A third mirror 344, a scanner optical system 345, and a line sensor 346 are provided behind the color filter 310 and the electro-developing recording medium 200. The line sensor 346 may be a one-dimensional CCD sensor of 2000 pixels, for example.

A light beam radiated from the light source 340 passes through the collimating lens 341, passes outside the first mirror 342, and is led to the second mirror 343. Then, the light beam is reflected by the second mirror 343, and is led to the electro-developing recording medium 200. The light beam radiated from the light source 340 is also reflected by the first mirror 342 and the third mirror 344, passes through the scanner optical system 345, and is led to the line sensor 346.

When an object image is recorded in the electro-developing recording medium 200, a positioning mark indicating the relative position of the image is optically recorded in each of the first, second, and third recording areas 201, 202, and 203 of the electro-developing recording medium 200. This positioning mark is recorded by a light beam reflected by the second mirror 343 at a place close to each of the recording areas 201, 202, and 203. When the image recorded in each of the recording areas 201, 202, and 203 is read, an illuminating light radiated by the light source 340 is reflected by the first and third mirrors 342 and 344, and is radiated onto the recording area. The illuminating light passes through the recording area, and is led to the line sensor 346. Namely, the light source 340 is used in the recording operation and the reading operation.

The color filter 310 and the electro-developing recording medium 200 can be moved in a direction perpendicular to the optical axis of the photographing optical system 301, i.e., in a direction the arrangement of the first, second, and third recording areas 201, 202, and 203. Control of the movement of the color filter 310 is carried out by a filter moving circuit 350. The electro-developing recording medium 200 is moved by a DC motor 351 or a stepping motor 352, and these motors 351 and 352 are controlled by the recording medium moving circuit 353.

In a photographing operation, the electro-developing recording medium 200 is moved at high speed by the DC motor 351, and the color filter 310 is moved with the electro-developing recording medium 200, so that the centers of the R filter element 311 and the first recording area 201, the centers of the G filter element 312 and the second recording area 202, or the centers of the B filter element 313 and the third recording area 203 are positioned on the optical axis of the photographing optical system 301.

When an image recorded on the electro-developing recording medium 200 is read, the color filter 310 is positioned to retreat from the first and third mirrors 342 and 344, i.e., the side of the shutter 22, for example. In this state, the electro-developing recording medium 200 is moved one horizontal scanning line at a time at low speed by the stepping motor 352, so that each of the recording areas 201, 202, and 203 is moved between the first and third mirrors 342 and 344 in a direction perpendicular to a line connecting these mirrors 342 and 344. At this time, the image recorded on the electro-developing recording medium 200 is illuminated by the light source 340 and formed on the light receiving surface of the line sensor 346, through the scanner optical system 345.

ON and OFF control of the light source 340 is performed by the system control circuit 300. The reading operation of pixel signals generated in the line sensor 346 and control of the recording medium drive circuit 353 are carried out by a recording medium reading circuit 354. These circuits 353 and 354 are controlled by the system control circuit 300.

Pixel signals read out from the line sensor 346 are amplified by an amplifier 355, and converted to a digital signal by an A/D converter 356. The digital pixel signals are subjected to a shading correction, a gamma correction, and so on by an image processing circuit 357 under the control of the system control circuit 300. The pixel signals outputted from the image processing circuit 300 are inputted to an interface circuit 358, so that the pixel signals are subjected to a predetermined process such as a format conversion, and can then be outputted to an external computer (not shown) through the communication connector 106 (see FIG. 2). The interface circuit 358 and the image recording device 357 are operated in accordance with a command signal outputted from the system control circuit 300.

An operation unit 360 including a switch such as the release button 105 provided on the camera body 100 is connected to the system control circuit 300. A photographing operation, in which an image is recorded on the electro-developing recording medium 200, and a reading operation, in which the image is read from the electro-developing recording medium 200, are performed by operating the operation unit 360. The liquid crystal display 116 (see FIG. 2) is connected to the system control circuit 300 to indicate various setting conditions of the electro-developing type camera.

Figure 4:
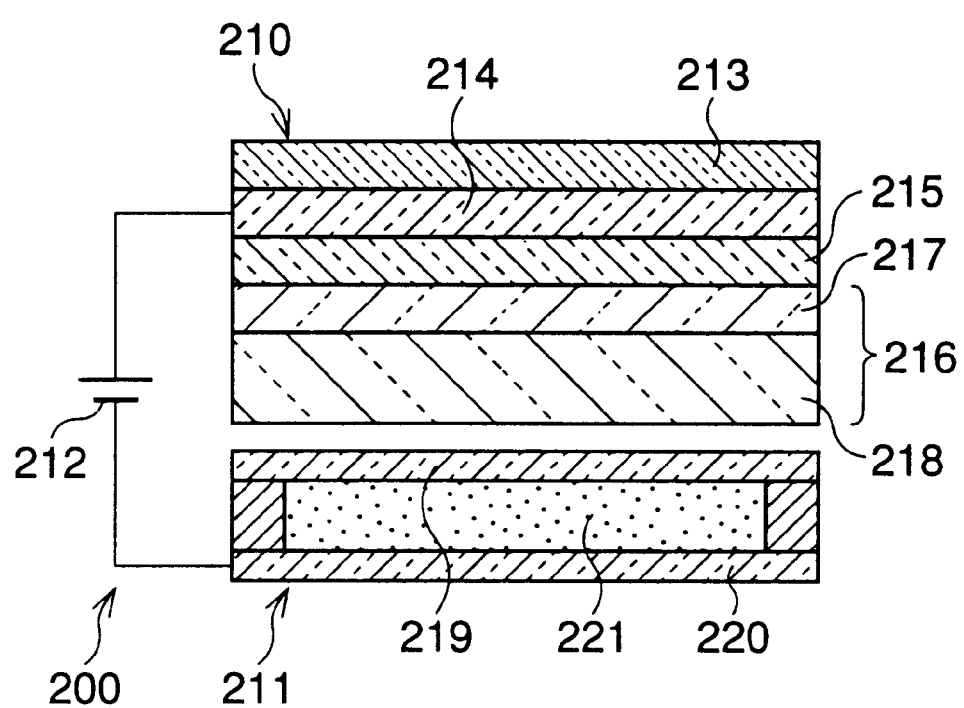
FIG. 4 is a sectional view showing a structure of an electro-developing recording medium.

FIG. 4 shows a structure of the electro-developing recording medium 200, and is the same as that shown in Japanese Unexamined Patent Publication No. 5-2280.

The electro-developing recording medium 200 has an electrostatic information recording medium 210 and an electric charge storage medium 211, and an electric voltage is applied thereto by an electric power source 212. The electrostatic information recording medium 210 is formed by laminating a glass base plate 213, an electrode layer 214, an inorganic oxide material layer 215 and a photoconducting layer 216, and the photoconducting layer 216 is formed by laminating an electric charge generating layer 217 and an electric charge transferring layer 218. The electric charge storage medium 211 is formed by confining liquid crystal 221, which is a smectic liquid crystal, between a liquid crystal supporting plate 219 and a liquid crystal electrode layer 220. The electric charge transferring layer 218 of the photoconducting layer 216 and the liquid crystal supporting plate 219 of the electric charge storage medium 211 face each other with a small gap therebetween.

An ON-OFF condition of the electric power source 212 is controlled by the recording medium drive circuit 333. When the electric power source 212 is turned on, an electric voltage is applied between the electrode layer 214 and the liquid crystal electrode layer 220, i.e., between the electrostatic information recording medium 210 and the electric charge storage medium 211. When the electrostatic information recording medium 210 is exposed while the electric voltage is applied, an electric charge is generated in the electrostatic information recording medium 210 in accordance with an image formed thereon. Since the intensity of the electric field applied to the liquid crystal 221 is changed in accordance with the electric charge, the image is indicated on the liquid crystal 221 as a visible image, and thus, an image of an object is developed. Namely, the visible image is generated in accordance with the electric charge.

The electric charge storage medium 211 is a liquid crystal display having a memory-type liquid crystal, such as a smectic liquid crystal, and thus, the developed visible image is kept therein even if the electric field is removed. In the liquid crystal, the developed visible image can be deleted by heating the liquid crystal, using a heating device (not shown) at a predetermined temperature. In such a case, the same electric charge storage medium 211 can be used repeatedly.

Figure 5:
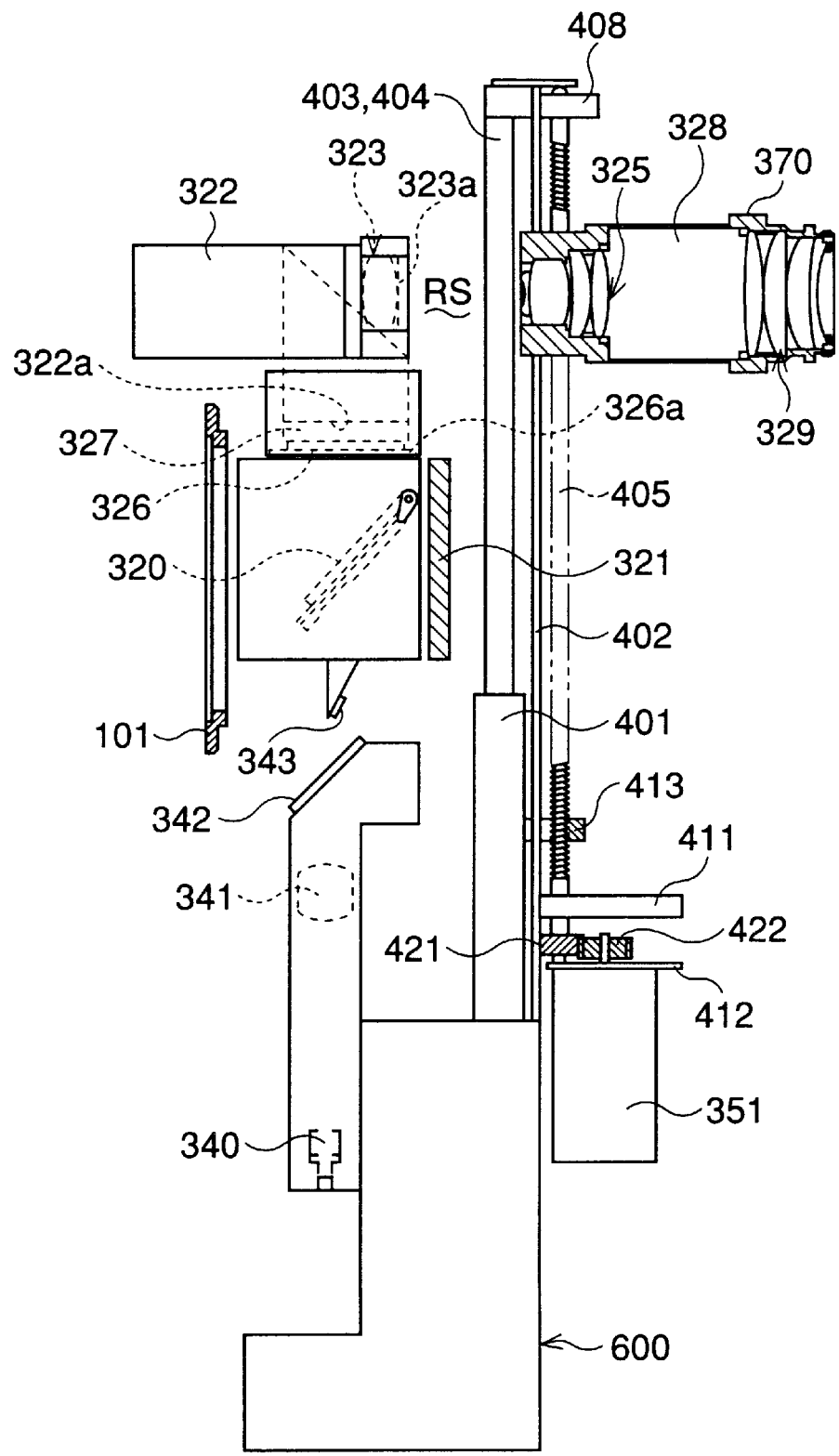
FIG. 5 is a side view, partially in cross-section, of a view finder optical system and a mechanism for moving up and down the electro-developing recording medium.
Figure 6:
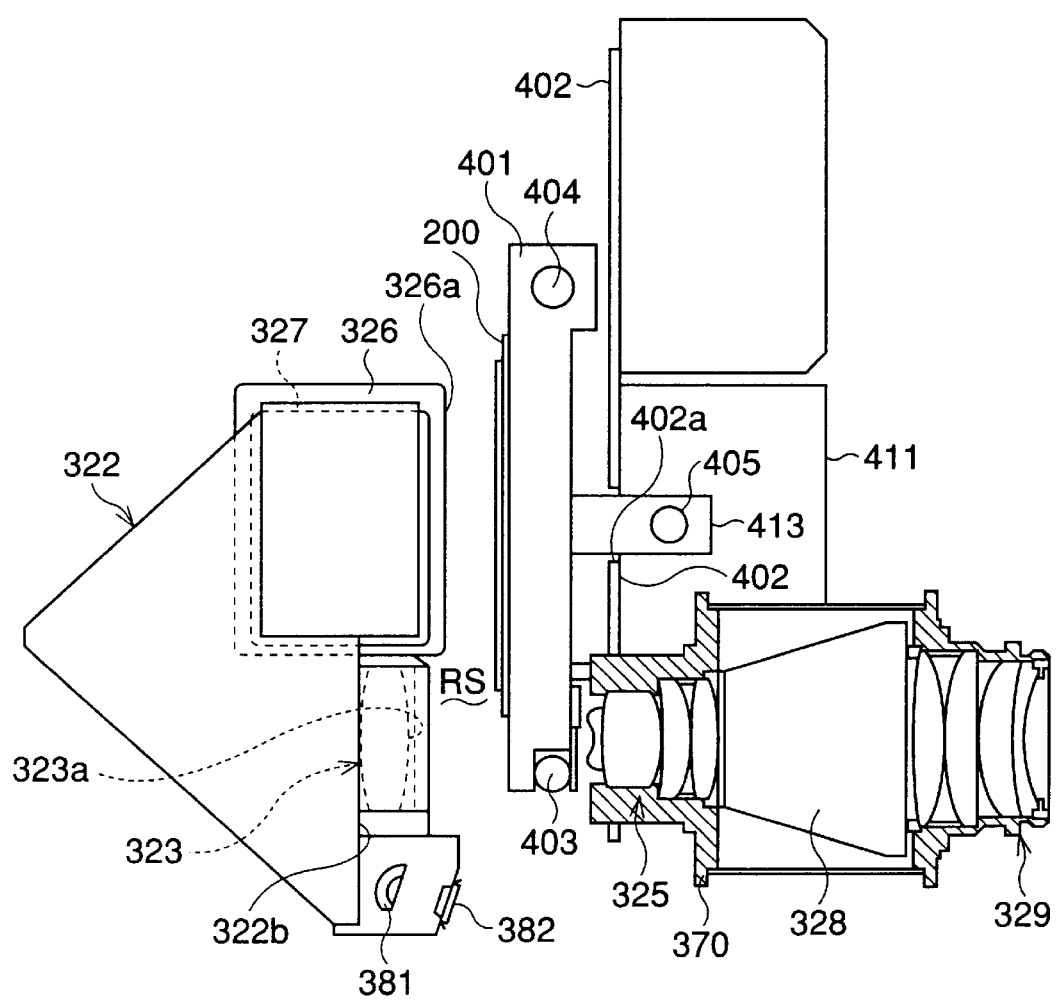
FIG. 6 is a plan view, partially in cross-section, of the view finder optical system and the mechanism for moving up and down the electro-developing recording medium.

FIGS. 5 and 6 show a mechanism for moving up and down the electro-developing recording medium 200, and the view finder optical system. In these drawings, the color filter is omitted.

The electro-developing recording medium 200 is attached to a recording medium holding frame 401, which is supported by a pair of shafts 403 and 404 to move up and down. The shafts 403 and 404 extend parallel to each other and in a direction perpendicular to the optical axis of the photographing optical system 301. The shutter 321 and the quick return mirror 320 are disposed in front of the shafts 403 and 404, i.e., the left side in FIGS. 5 and 6. The lens mount 101 is provided in front of the quick return mirror 320.

A base plate 402 is disposed behind the shafts 403 and 404, a drive screw 405 extending parallel to the shafts 403 and 404 is provided behind the support plate 404. An opening 402a is formed in the base plate 402, so that an engaging member 413 fixed on the recording medium holding frame 401 is engaged with a screw groove formed on the drive screw 405. The drive screw 405 is rotatably supported by a support member 408 provided on the upper end of the base plate 402 and a first support plate 411 fixed on a lower portion of the base plate 402. When the drive screw 405 is rotated about the axis thereof, the recording medium holding frame 401 and the electro-developing recording medium 200 are moved up and down along the shafts 403 and 404 due to the engagement of the engaging member 413 and the drive screw 405.

A drive gear 421 is provided on a projecting portion of the drive screw 405, which is projected downward from the support plate 411. A DC motor 351 is attached on an under surface of a second support plate 412 provided in parallel to the first support plate 411, and a gear 422 fitted on the output shaft of the DC motor 351 is positioned at an upper portion of the second support plate 412 and is meshed with the drive gear 421. Accordingly, when the DC motor 351 is driven, the drive screw 405, the gears 421 and 422 are rotated to move up and down the recording medium holding frame 401. Namely, the electro-developing recording medium 200 is moved by the DC motor 351 by one frame at a time, i.e., the vertical length of each of the recording areas 201, 202, and 203.

A mounting mechanism 600 provided below the shafts 403 and 404 is provided for mounting the electro-developing recording medium 200 to the recording medium holding frame 401. The mounting mechanism 600 is provided with members operated by handling the dial 121 or the ejection button 122.

The Poro prism 322 is disposed above the quick return mirror 320. A focusing glass 326, on which an object image is formed by the photographing optical system 301, is provided close to an incident plane 322a of the prism 322, and a condenser lens 327 is provided between the incident plane 322a and the focusing glass 327. An edge 326a of the focusing glass 326, which edge is close to the electro-developing recording medium 200, and an emergent plane 323a of the first optical system 323 are positioned approximately on the same plane.

A cylindrical holder 370 is fixed to the base plate 402, in which the relay optical system 325, an erecting prism 328, and a second optical system (i.e., an eyepiece lens system) 329 are housed. The relay optical system 325 is disposed in the front end of the holder 370, and the second optical system 329, which is the eye piece, is disposed in the read end of the holder 370. The erecting prism 328 is disposed between the relay optical system 325 and the second optical system 329.

The relay optical system 325 is positioned behind the shaft 404 and is offset towards the other shaft 404. The relay optical system 325 faces the first optical system 323 to shift the eye point of the view finder optical system in a direction away from the first optical system 323. An image formed by the first optical system 323 and the relay optical system 325 is horizontally and vertically inverted by the erecting prism 328. The image inverted by the erecting prism 328 can be observed through the second optical system 329.

Namely, the prism 322, the first optical system 323, the relay optical system 325, the erecting prism 328, and the second optical system 329 are located below the upper ends of the shafts 403 and 404. Thus, a recording medium passage RS, through which the electro-developing recording medium 200 can move, is formed between the first optical system 323 and the relay optical system 325. In other words, the recording medium passage RS passes through the view finder optical system, and is extended in a direction approximately perpendicular to the optical axis of the view finder optical system.

A condenser lens 381 and a phorometry sensor 382 are provided in a portion close to an emergent plane 322b of the prism 322 and beside the first optical system 323.

A photographing operation of this camera is described below.

The electro-developing recording medium 200 can be mounted on the recording medium holding frame 401, when the recording medium holding frame 401 is in the lowermost position of the shafts 403 and 404. Namely, the electro-developing recording medium 200 is inserted through the slot 120 into the camera body 100, and the dial 121 is rotated to rotate a rubber roller (not shown), so that the electro-developing recording medium 200 is set to a predetermined position.

In the initial state, the first recording area 201 of the electro-developing recording medium 200 and the R filter element 311 of the color filter 310 are positioned in the optical path of the photographing optical system 301. The quick return mirror 320 is in the down position, and thus, a light beam passing through the photographing optical system 301 is reflected by the quick return mirror 320, and is led to the focusing glass 326. Namely, an object image is formed on the focusing glass 326. This object image can be observed through the condenser lens 327, the prism 322, the first optical system 323, the relay optical system 325, the erecting prism 328, and the second optical system 329.

When the release button 105 is depressed, the photographing operation is carried out, and thus, the quick return mirror 320 is set to the up position, and the shutter 321 is open for a predetermined period, so that an R image is recorded in the first recording area 201. After the shutter 321 is closed, the electro-developing recording medium 200 and the color filter 310 are moved upward, so that the second recording area 202 and the G filter element 312 are set in the optical path of the photographing optical system 301. Then, the shutter 321 is again open for a predetermined period, so that a G image is recorded in the second recording area 202. In a similar way described above, after the shutter 321 is closed, the third recording area 203 and the B filter element 313 are set in the optical path of the photographing optical system 301. Then, the shutter 321 is again open for a predetermined period, so that a B image is recorded in the third recording area 203.

After the shutter 321 is closed to complete the recording operation of the B image, the recording medium holding frame 401 and the electro-developing recording medium 200 are moved downward to reach the initial position, and the quick return mirror 320 is returned to the down position. Thus, the object can be observed through the view finder optical system.

As described above, this embodiment is constructed in such a manner that the recording medium holding frame 401 and the electro-developing recording medium 200 can be moved between the first optical system 323 and the relay optical system 325. Therefore, while an object image is recorded in each of the first through third recording areas 201, 202, and 203, the recording medium holding frame 401 and the electro-developing recording medium 200 can enter the view finder optical system. Namely, the view finder optical system is provided in a position to interfere the recording medium passage RS. Accordingly, by this interfering amount, the height of the camera body 100, i.e., the size along a direction in which the electro-developing recording medium 200 is moved up and down, can be reduced.

Further, the view finder optical system including the prism 322 and the relay optical system 325 is arranged to face a portion where the electro-developing recording medium 200 is moved, and is not largely projected in a lateral direction from the shafts 403 and 404. Therefore, the electro-developing type camera can be constructed as compactly as possible.

Note that the first optical system 323 can be provided behind the recording medium passage RS, i.e., the side of the relay optical system 325.

Figure 7:
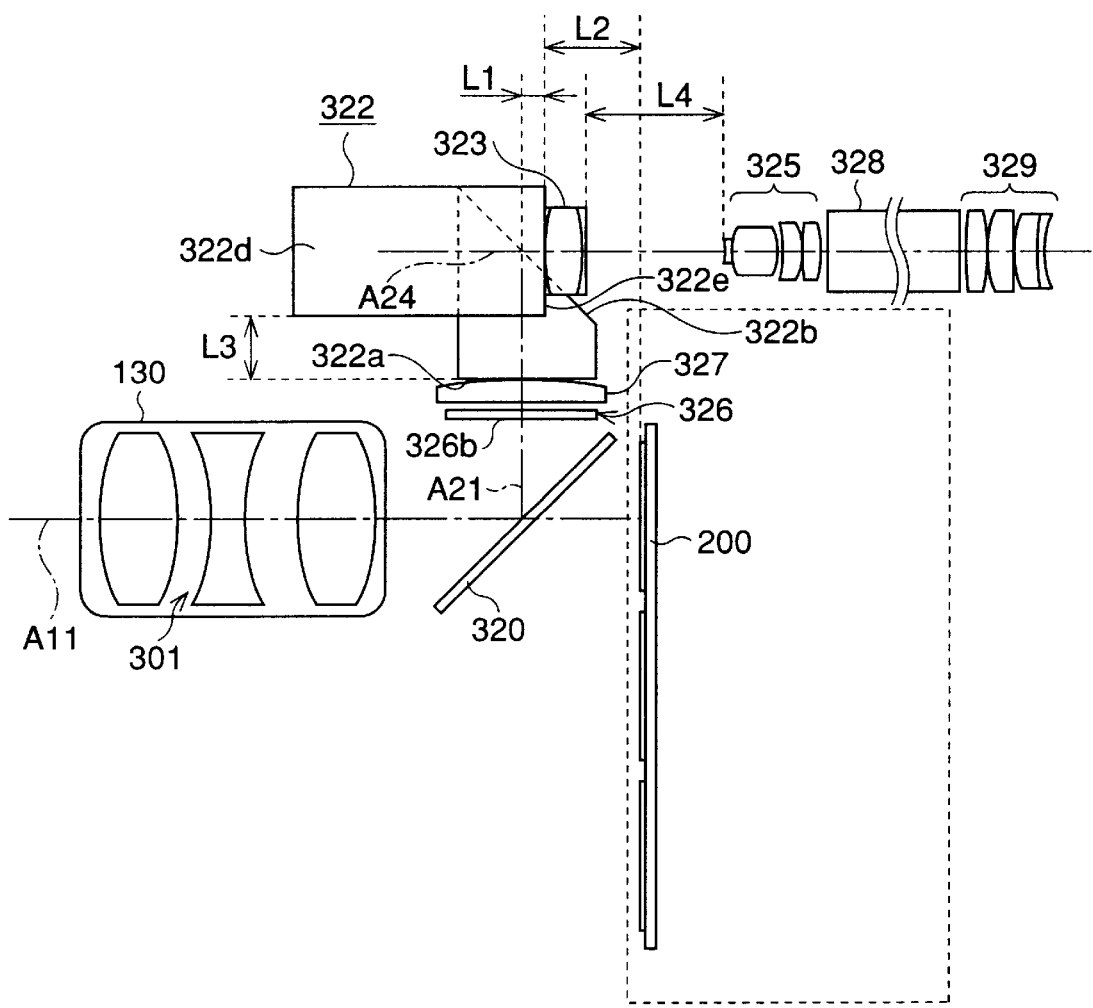
FIG. 7 is a side view showing an optical system provided in the first embodiment.

An optical structure of the embodiment is described below in detail, with reference to FIGS. 7, 8, and 9.

When the quick return mirror 320 is in the down position, the surface of the quick return mirror 320 crosses the photographing optical axis A11 of the photographing optical system 301 at 45 deg. Therefore, this photographing optical axis A11 is bent by the surface of the quick return mirror 320 by 90 deg in a direction, parallel to movement of the electro-developing recording medium 200, to generate a first finder optical axis A21.

On the first finder optical axis A21, an upper surface 326b of the focusing glass 326 is disposed on a plane which is optically equivalent to the surface of the electro-developing recording medium 200. Therefore, when the quick return mirror 320 is in the down position, an object image obtained by the photographing optical system 301 is formed on the upper surface 326 of the focusing glass 326. As shown in FIG. 6, the shape of the focusing glass 326 is approximately a rectangle which corresponds to the shape of the image formed on the electro-developing recording medium 200, i.e., the shape of the aperture of the shutter 321.

A condenser lens 327, which is a plano-convex lens whose lower surface (the lower surface in FIG. 7) is a plane, is provided to separate from the upper surface 326b of the focusing glass 326 by 1.60 mm along the first finder optical axis A21. This condenser lens 327 is made of glass whose index of refraction is 1.80518. A radius of curvature of the upper surface of the condenser lens 327 is 78.0 mm, and the thickness on the first finder optical axis A21 is 3.50 mm.

The Poro prism 322 is 0.10 mm from the upper surface of the condenser lens 327 along the first finder optical axis A21. The Poro prism 322 which is an erecting system is disposed in such a manner that the incident plane 322a crosses the first finder optical axis A21 at a right angle. FIG. 8 is a perspective view showing the Poro prism 322. This Poro prism 322 is made of glass whose index of refraction is 1.77250. As shown in FIGS. 7, 8, and 9, the prism 322 has a first reflecting plane 322b which vertically inverts an image in association with the quick return mirror 320, and a second reflecting plane 322c and a third reflecting plane 322d which horizontally invert an image, respectively.

The first reflecting plane 322b crosses the first finder optical axis A21 at 45° at the center of the plane 322b so that the first finder optical axis A21 is bent to the object to be photographed, by 90°, and thus a second finder optical axis A22, which is parallel to the photographing optical axis A11, is generated. The first distance between the incident plane 322a and the first reflecting plane 322b on the first finder optical axis A21 is 22.0 mm. The incident plane 322a is projected to the quick return mirror 320 in comparison with a bottom surface 322g of the Poro prism 322 by 10.5 mm (the distance L3), the bottom surface 322g being sandwiched by the third reflecting plane 322d and the emergent plane 322e.

The second reflecting plane 322c crosses the second finder optical axis A22 at 45° at the center of the plane 322c so that the second finder optical axis A22 is bent to the left, when viewing from the electro-developing recording medium 200, by 90°, and thus a third finder optical axis A23 is generated. In other word, the second finder optical axis A22 is bent in a direction, which is parallel to the surface of the recording medium 200 and is perpendicular to a line along which the recording medium 200 is moved, to generate the third finder optical axis A23. The second distance between the first reflecting plane 322b and the second reflecting plane 322c on the second finder optical axis A22 is 23.5 mm.

The third reflecting plane 322d crosses the third finder optical axis A23 at 45° at the center of the plane 322d so that the third finder optical axis A23 is bent to the electro-developing recording medium 200, by 90° deg, and thus a fourth finder optical axis A24, which is parallel to the photographing optical axis A11, is generated. The third distance between the second reflecting plane 322c and the third reflecting plane 322d on the third finder optical axis A23 is 27.5 mm.

The emergent plane 322e crosses the fourth finder optical axis at a right angle. The fourth distance between the third reflecting plane 322d and the emergent plane 322e is 27.0 mm. Accordingly, the difference between the fourth distance and the second distance (23.5 mm), i.e., the distance L1 from the first finder optical axis A21 to the emergent plane 322e along the photographing optical axis A11 is 3.5 mm. Since the distance from the surface of the quick return mirror 320 to the surface of the electro-developing recording medium 200 on the photographing optical axis A11 is 22.0 mm, the distance L2 from the emergent plane 322e to the surface of the electro-developing recording medium 200 on the fourth finder optical axis A24 is 18.5 mm. The emergent plane 322e is offset towards the object to be photographed, relative to an edge of the incident plane 322a, i.e., the edge close to the electro-developing recording medium 200, by 8.5 mm along the photographing optical axis A11. Note that the distance from the incident plane 322a to the emergent plane 322e on the finder optical axes A21, A22, A23, and A24 is 100 mm.

Based on the above described data, the equivalent air distance S from the upper surface of the focusing glass 326 to the emergent plane 322e of the prism 322 is obtained by the following formula (1), the equivalent air distance being the length of the ray if the ray passing through the prism 322 passed in the air:

$$S = 1.6 + 3.5/1.80518 + 0.1 + 100/1.77250 \quad (1)$$
$$= 60.06 \text{ [mm]}$$

The first optical system 323, which is an erecting system and is coaxially with the fourth finder optical axis A24, is provided at a position which is separated by 0.10 mm from the emergent plane 322e along the fourth finder optical axis A24. The thickness of the first optical system 323 along the fourth finder optical axis A24 is 6.5 mm. Therefore, an emergent plane of the first optical system 323 is positioned at a side of the object to be photographed with respect to an edge of the incident plane 322a in a direction along the photographing optical axis A11, the edge being close to the surface of the electro-developing recording medium 200. Therefore, the electro-developing recording medium 200, the recording medium holding frame 401, and the shaft 403 do not interfere with the first optical system 323.

The focal length "fe" of the first optical system 323 is 63.11 mm. The ratio of each of the distances L1, L2, and L3 to the focal length "fe" is as follows:

L1/fe=0.06
L2/fe=0.29
L3/fe=0.17

The relay optical system 325, which is a life-size optical system and separates the eye point from the first optical system 323, is disposed at a position which is separated from the emergent plane of the first optical system 323 by 21,91 mm (L4) along the fourth finder optical axis A24. Therefore, this relay optical system 325 is positioned behind the electro-developing recording medium 200, the recording medium holding frame 401, and the shaft 403 in a direction of the fourth finder optical axis A24. The ratio of the distance L4 to the focal length "fe" is as follows:

L4/fe=0.35

Figure 8:
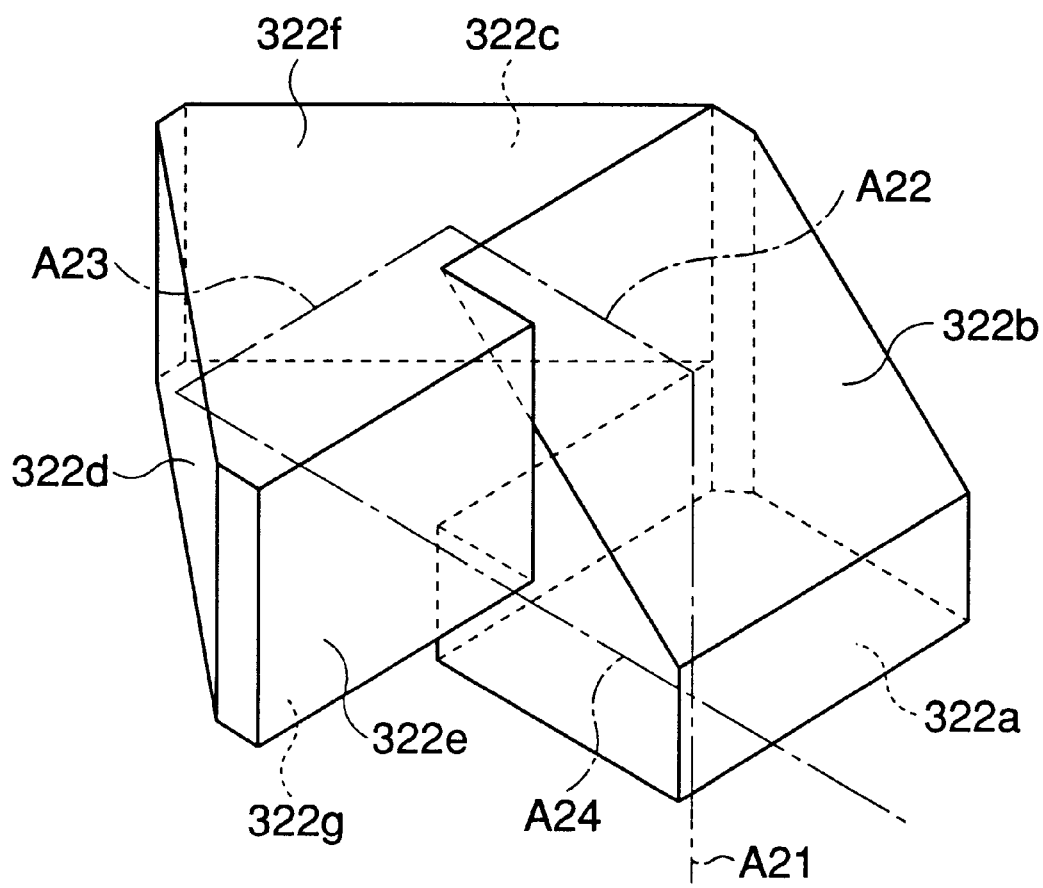
FIG. 8 is a perspective view showing a Poro prism provided in the first embodiment.

The fourth finder optical axis A24 passes outside the electro-developing recording medium 200 between the first optical system 323 and the relay optical system 325, as understood from FIG. 8.

The erecting prism 328, which vertically and horizontally inverts an image formed by the first optical system 323 and the relay optical system 325, is provided at a position where it is separated from the emergent plane of the relay optical system 325 by 1.00 mm along the fourth finder optical axis A24.

The second optical system 329, by which the image formed by the erecting prism 328 is enlarged, is disposed at a position where it is separated from an emergent plane of the erecting prism 328 by 1.02 mm along the fourth finder optical axis A24.

The above described lens data of the view finder optical system, which is the optical system from the focusing plane, i.e., the upper surface 326b to the emergent plane of the second optical system 329, is shown in the following table. Note that, in the following table, "No." implies the number of each of plane counted from the focusing plane 326b. More precisely, "No. 1" implies the focusing plane 326b, "No. 2" and "No. 3" imply the incident plane and the emergent plane of the condenser lens 327. "No. 4" and "No. 5" imply the incident plane and the emergent plane of the Poro prism 322, respectively, and each of the reflecting planes is omitted. "No. 6" through "No. 8" imply the planes of the first optical system 323, respectively. "No. 9" through "No. 15" imply the planes of the relay optical system 325, respectively. "No. 16" through "No. 19" imply the planes of the erecting prism 328, respectively, and the planes include the reflecting planes. "No. 20" through "No. 26" imply the planes of the second optical system 329. "r" implies a radius of curvature of each of the planes. "d" implies a distance from the present plane to the next plane on the optical axis. "n" implies the index of refraction of the material from the present plane to the next plane with respect to the d-line, and the index of reflection of air is omitted. "v" is the Abbe number.

| No. | r | d | n | v |
|---|---|---|---|---|
| 1 | ∞ | 1.60 | | |
| 2 | ∞ | 3.50 | 1.80518 | 24.5 |
| 3 | −78.00 | 0.10 | | |
| 4 | ∞ | 100.00 | 1.77250 | 49.6 |
| 5 | ∞ | | | |
| 6 | 38.13 | 5.70 | 1.74400 | 44.8 |
| 7 | −43.00 | 0.80 | 1.80518 | 25.4 |
| 8 | 320.00 | 21.91 | | |
| 9 | −7.60 | 1.20 | 1.80518 | 24.5 |
| 10 | 21.27 | 7.10 | 1.55963 | 61.2 |
| 11 | −14.79 | 0.58 | | |
| 12 | −39.01 | 3.02 | 1.78590 | 44.2 |
| 13 | −18.00 | 0.24 | | |

-continued

| No. | r | d | n | ν |
|---|---|---|---|---|
| 14 | 59.20 | 2.80 | 1.71700 | 47.9 |
| 15 | −30.39 | 1.00 | | |
| 16 | ∞ | 49.71 | 1.51633 | 64.1 |
| 17 | ∞ | 0.90 | | |
| 18 | ∞ | 29.72 | 1.56883 | 56.3 |
| 19 | ∞ | 1.02 | | |
| 20 | 94.43 | 3.20 | 1.80610 | 40.9 |
| 21 | −52.20 | 0.24 | | |
| 22 | 27.00 | 3.65 | 1.74400 | 44.8 |
| 23 | 1430.84 | 0.24 | | |
| 24 | 21.95 | 3.89 | 1.62280 | 57.0 |
| 25 | 54.40 | 1.20 | 1.80518 | 25.4 |
| 26 | 20.14 | | | |

As shown in FIG. 5, the condenser 381 is provided beside the first optical system 323 and close to the emergent plane 322e of the Poro prism 322, so that the light beam radiated from the focusing glass 326 is converged. A photometry sensor 382 is disposed behind the condenser lens 381, so that the light beam converged by the condenser lens 381 is received by the photometry sensor 382 to sense the brightness of the focusing glass 326. As described above, the output signal of the photometry sensor 382 is inputted into the exposure control circuit 332, and thus, the photometry value of the object to be photographed is indicated on the liquid crystal display 116, so that the photometry value can be used by the photographer to decide the exposure condition of the camera.

As described above, in the optical construction of this embodiment, a light beam radiated by the focusing glass 326 enters the incident plane 322a of the Poro prism 322 through the condenser lens 327. In the prism 322, the light beam is bent by the first reflecting plane 322b to the object to be photographed, along the second finder optical axis A22, is bent by the second reflecting plane 322c to the left when viewing from the photographer, is bent by the third reflecting plane 322d to the photographer, and is radiated from the emergent plane 322e. This radiated light beam enters the first optical system 323.

Since the focal length of the first optical system 323 is longer than the equivalent air distance of the optical path from the focusing glass 326 to the first optical system 323, the first optical system 323 forms a virtual image of the object image, which is a real image formed on the focusing glass 326, on an imaging plane positioned to a side of the object. This virtual image is relayed by the relay optical system 325, and vertically and horizontally inverted by the erecting prism 328, and is enlarged by the second optical system 329, so that the photographer can see the object image.

Thus, the position of the fourth finder optical axis A24 is shifted in a horizontal direction from the first finder optical axis A21, in a plane parallel to the surface of the electro-developing recording medium 200. Accordingly, the fourth finder optical axis A24 passing through the first optical system 323 passes between the recording medium passage RS and the shaft 403. Therefore, the rear surface of the electro-developing recording medium 200 is not exposed to the ambient light, which enters the view finder window 110, and passes through the second optical system 329, the erecting prism 328, and the relay optical system 325. Further, since the finder optical axes A22, A23, and A24 are not largely separated from the photographing optical axis A11, the camera body 100 is not vertically elongated.

Furthermore, since the shifted amount of the fourth finder optical axis A24 in the horizontal direction is restricted to the minimum by which the fourth finder optical axis A24 does not interfere the recording medium passage RS, the horizontal length of the camera body 100 is not elongated.

The emergent plane 322e of the Poro prism 322 is offset to the object with respect to the edge of the incident plane 322a, the edge being close to the electro-developing recording medium 200. In the space formed by the offset of the emergent plane 322a, the first optical system 323 is disposed. Therefore, the emergent plane of the first optical system 323 is positioned to the object in the direction of the photographing optical axis A11 in comparison with the surface of the electro-developing recording medium 200. Therefore, in the photographing operation, the first optical system 323 is prevented from interfering the color filter 310, the electro-developing recording medium 200, and the recording medium holding frame 401.

Since the incident plane 322a of the Poro prism 322 is projected in comparison with the bottom surface 322g sandwiched by the third reflecting plane 322d and the emergent plane 322e, a portion of the Poro prism 322, which is sandwiched by the second reflecting plane 322c and the third reflecting plane 322d, i.e., the portion projecting to the object, is separated upward from the focusing glass 326 and the condenser lens 327. Therefore, even if the interchangeable lens 130 is attached to the lens mount 101 which is positioned to a side of the electro-developing recording medium 200 in comparison with the edge line between the second reflecting plane 322c and the third reflecting plane 322d, the outer periphery of the interchangeable lens 130 does not interfere a Poro prism housing 100a (see FIG. 1) of the camera body 100. Further, when the interchangeable lens 130 is attached to or detached from the lens mount 101, there is a space for handling an aperture ring (not shown) or a distance ring (not shown) of the interchangeable lens 130, or a space for handling the attaching and detaching operations.

A space, through which the color filter 310, the electro-developing recording medium 200, and the recording medium holding frame 401 can pass, is formed between the emergent plane of the first optical system 323 and the incident plane of the relay optical system 325. Therefore, although the eye point of the view finder is shifted rearward by the relay lens 325, the erecting prism 328, and the second optical system 329, these optical systems 325, 328, and 329 do not interfere the color filter 310, the electro-developing recording medium 200, and the recording medium holding frame 401.

Figure 10:
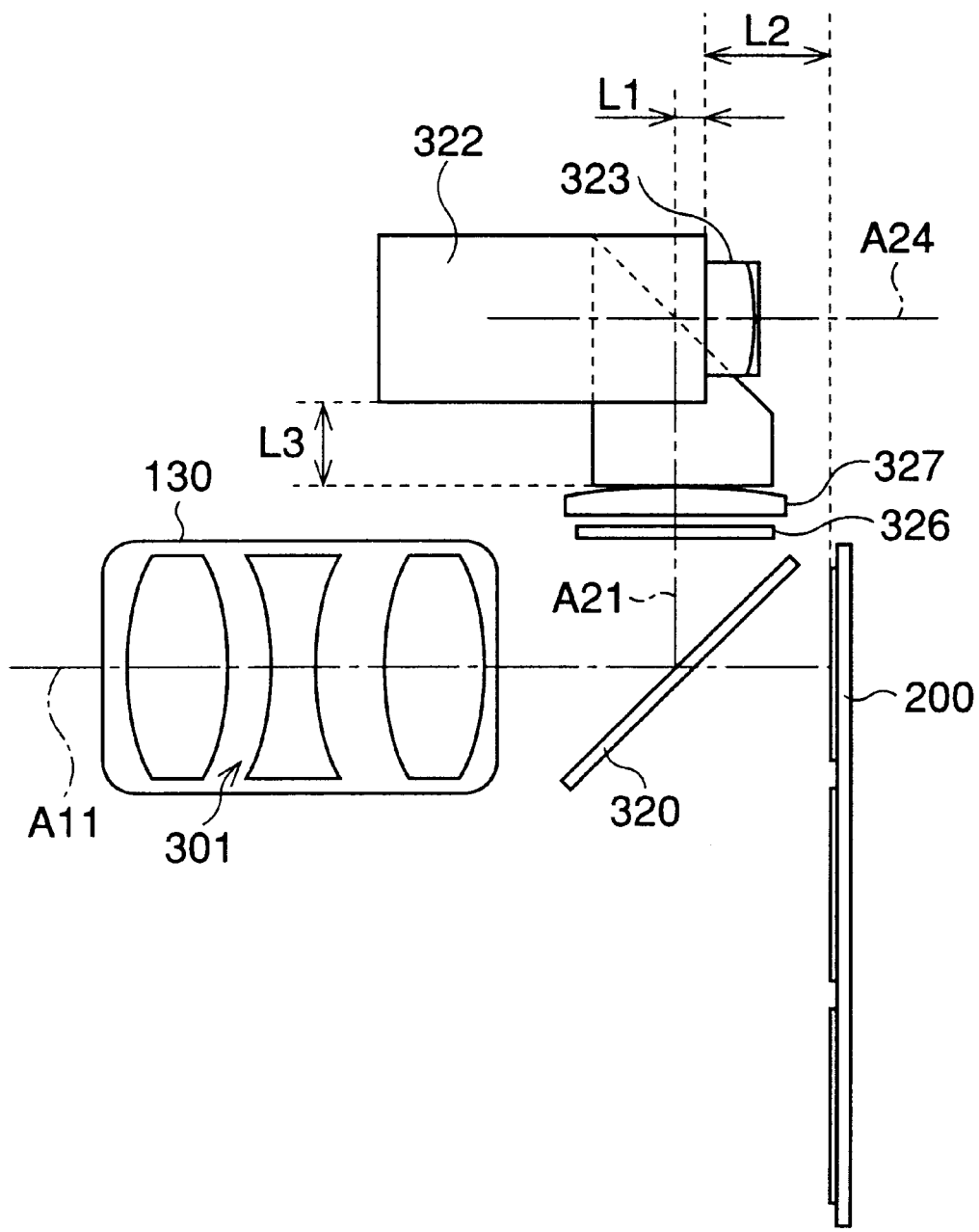
FIG. 10 is a side view showing an optical system of a second embodiment of the present invention.

FIG. 10 shows a construction of an optical system of a second embodiment of the present invention. As shown in FIG. 10, the second embodiment has a feature in which the relay lens 325, the erecting prism 328, and the second optical system 329 are omitted in comparison with the first embodiment.

Such a construction can be applied when a space, in which a mechanism is provided behind the electro-developing recording medium 200, is small in a direction of the fourth finder optical axis A24. In this case, the photographer can observe the object image formed on the focusing glass 326 by placing his eye on the eye point of the first optical system 323. This eye point of the first optical system 323 is positioned outside the view finder window 110. A space, through which the color filter 310, the electro-developing recording medium 200, and the recording medium holding frame 401 can pass, is formed between the emergent plane of the first optical system 323 and the view finder window 110, on the fourth finder optical axis A24. Accordingly, the view finder window 110 and the eye of the photographer do not interfere the color filter 310, the electro-developing recording medium 200, and the recording medium holding frame 401. The other constructions of the second embodiment including the distances L1, L2, and L3, and the focal length "fe" are the same as the first embodiment.

Figure 11:
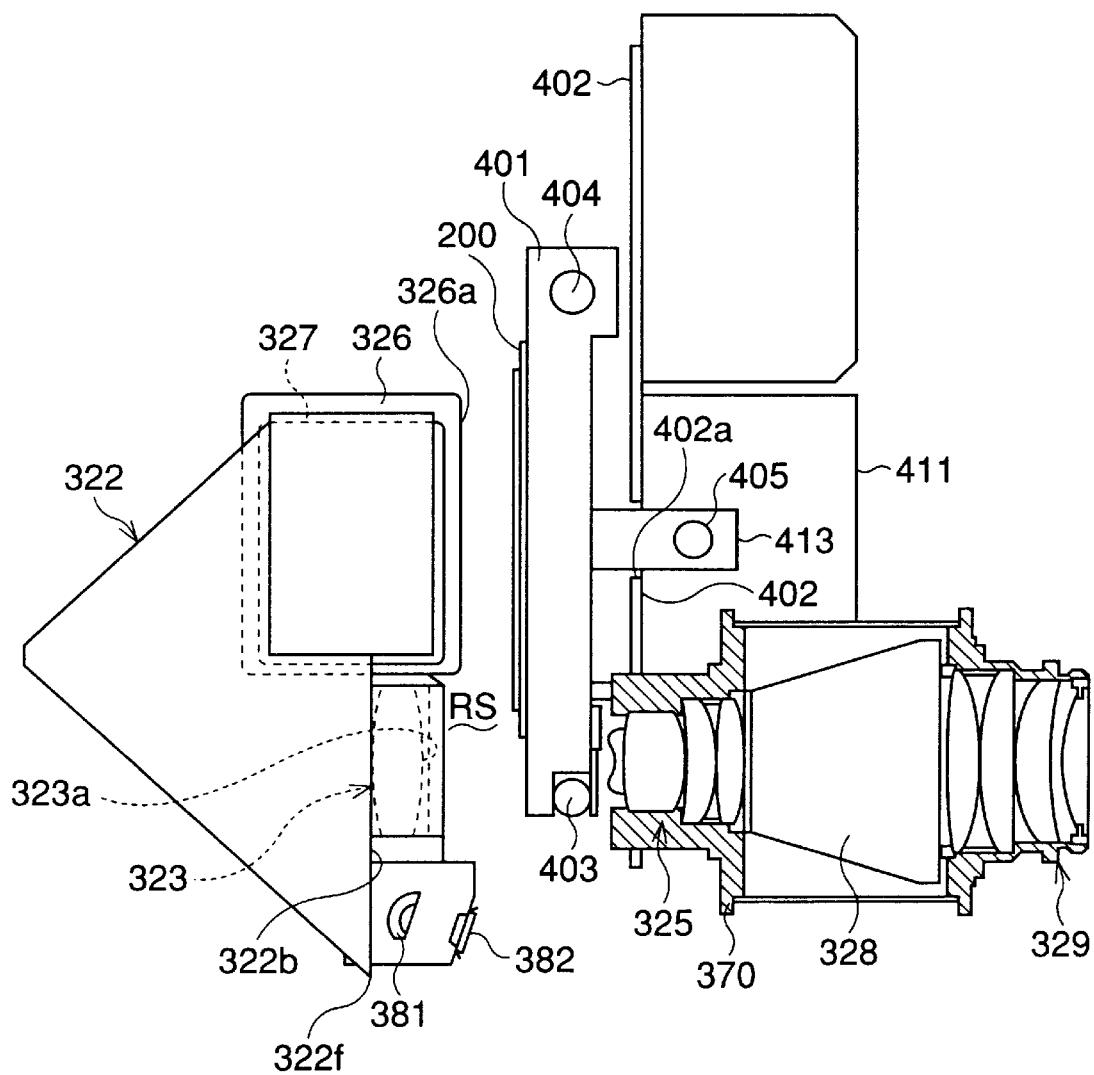
FIG. 11 is a plan view, partially in cross-section, of a view finder optical system and a mechanism for moving up and down the electro-developing recording medium, in a third embodiment.
Figure 12:
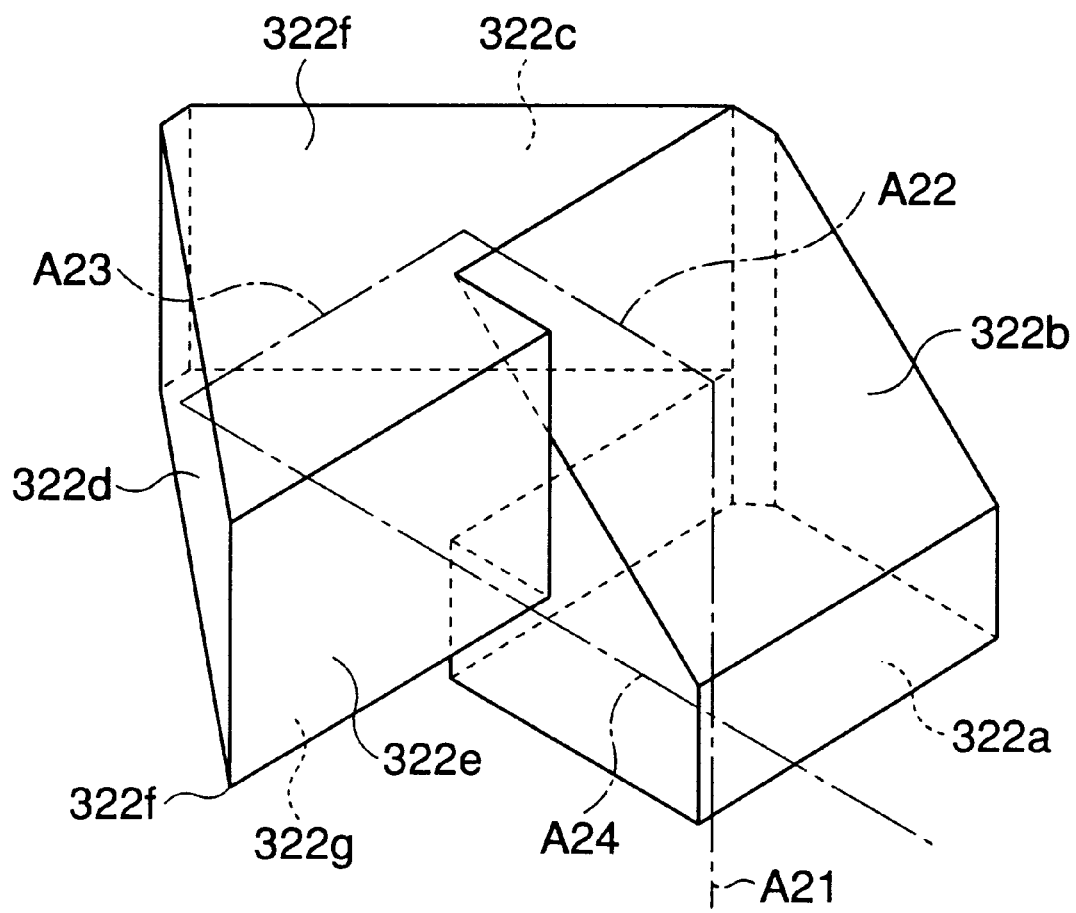
FIG. 12 is a perspective view showing a Poro prism provided in the third embodiment.

FIG. 11 is a plane view showing the view finder optical system and the mechanism for moving up and down the electro-developing recording medium 200, in a third embodiment. FIG. 12 is a perspective view of the Poro prism 322. The difference between the third embodiment and the first embodiment is the shape of the Poro prism 322 as understood from comparing FIGS. 6 and 11, or FIGS. 8 and 12. Namely, the third reflecting plane 322d crosses the emergent plane 322e at 45°, to form an edge 322f whose shape is like a wedge. The other constructions in the third embodiment are basically the same as the first embodiment.

Figure 13:
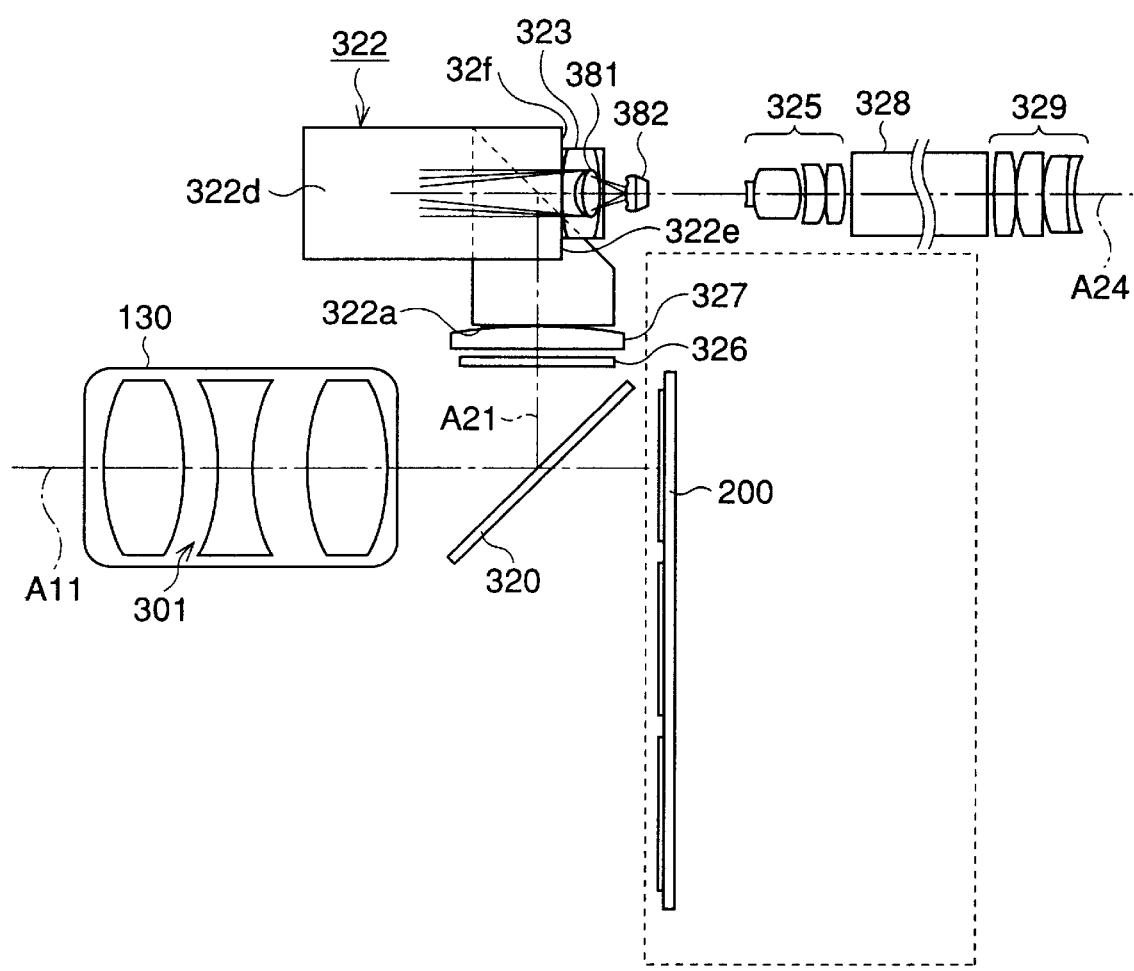
FIG. 13 is a side view showing an optical system provided in the third embodiment.
Figure 14:
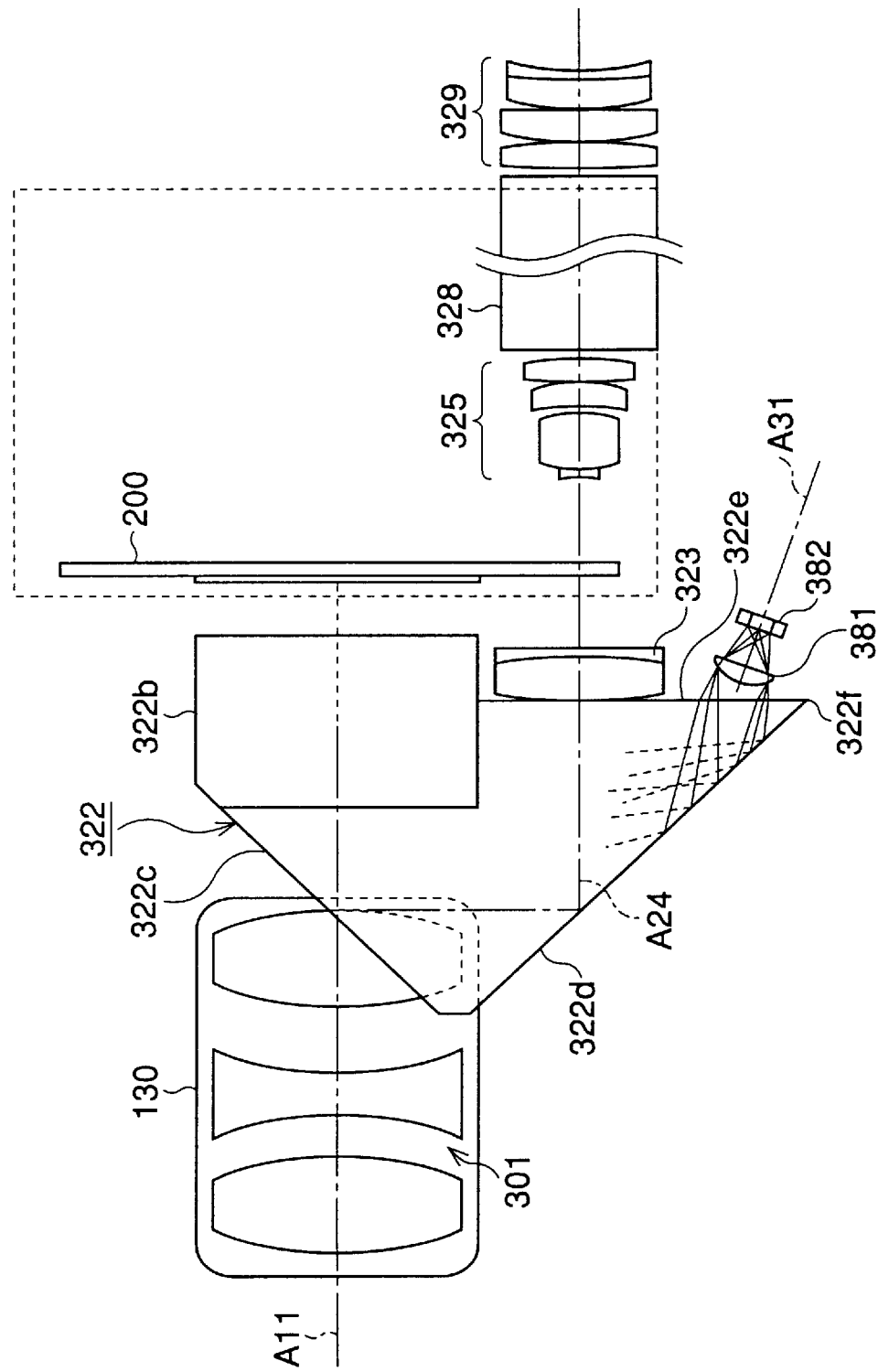
FIG. 14 is a plan view showing the optical system shown in FIG. 13.

With reference to FIGS. 13 and 14, a construction of the photometry system provided behind the emergent plane 322e of the Poro prism 322 is described below. The photometry system comprises the photometry sensor 381 and the condenser lens 382 disposed beside the first optical system 323.

The optical axis of the condenser lens 381, i.e., the photometry optical axis A31 passes through a horizontal plane containing the fourth finder optical axis A24. Namely, the photometry optical axis A31 crosses the emergent plane 322e at a position, which is offset by D=18.40 mm to the edge 322f in comparison with the fourth finder optical axis A24, as shown in FIG. 14. The angle θ (see FIG. 15) formed by this photometry optical axis A31 and a straight line normal to the emergent plane 322e is obtained according to the following formula (2), based on s=60.06 mm and D=18.40 mm, due to a necessity in which the photometry optical axis A31 crosses the first finder optical axis A21 on the focusing plane 326b, i.e., the center of the focusing plane 326b.

$$\theta = \tan^{-1}(D/s) \qquad (2)$$
$$= \tan^{-1}(18.40/60.06)$$
$$\approx 17.03 \ [\deg]$$

Actually, by taking into consideration the power of the condenser lens 327, the angle θ is set to 17.4°. Therefore, the photometry optical axis A31, i.e., the optical axis of the condenser lens 381, is inclined to the optical axis of the first optical system 323 so that the optical axis of the condenser lens 327 separates from the optical axis of the first optical system 323 as the condenser lens 327 comes close to the photometry sensor 382.

Figure 15:
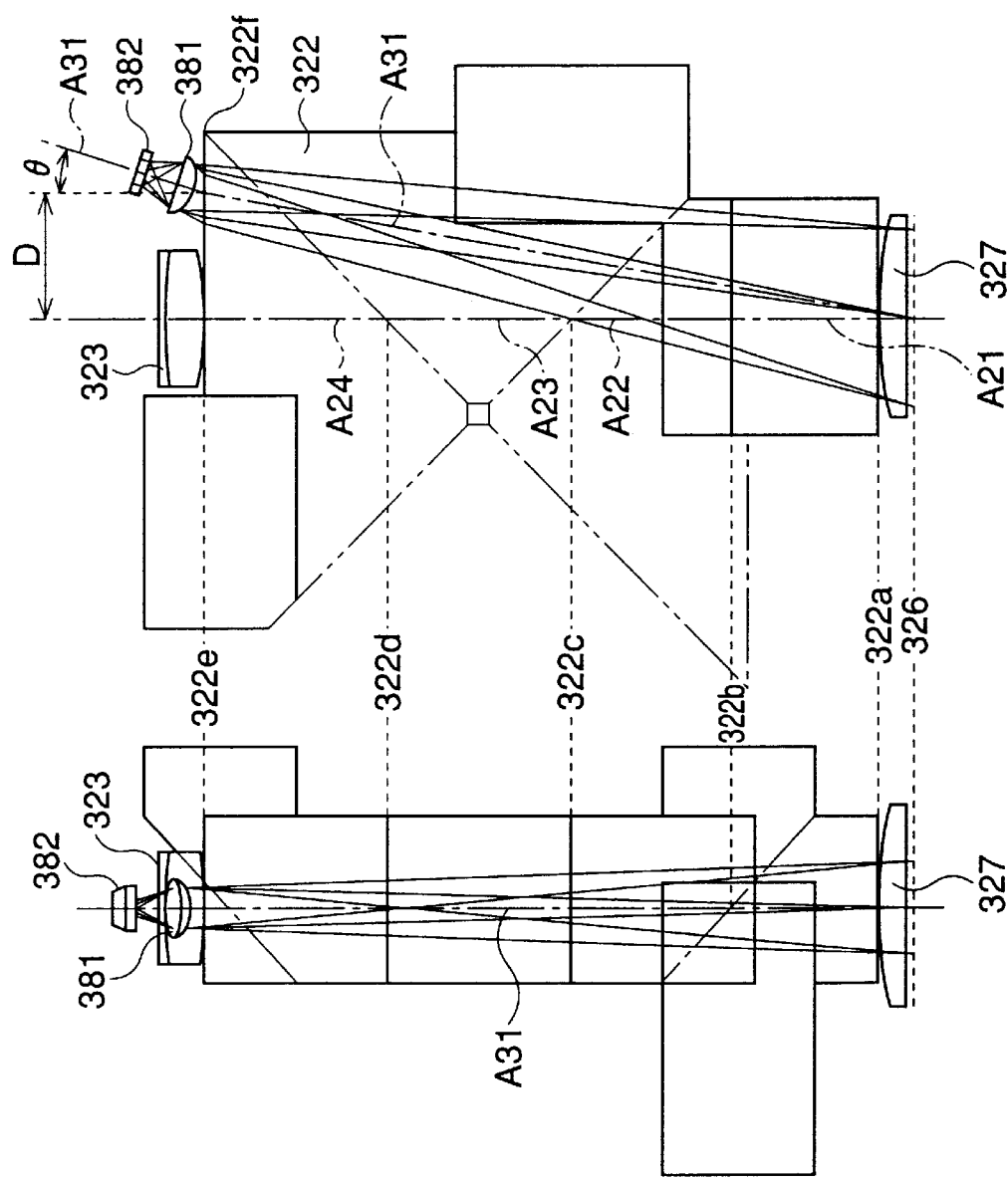
FIG. 15 is a view showing a state in which the photometry optical axis crosses the finder optical axis at the center of the focusing plane, in the third embodiment.

FIG. 15 shows a state in which the photometry optical axis A31 crosses the finder optical axis A21 at the center of the focusing plane 326b, according to the above conditions. The left side of FIG. 15 is an optical path chart, in which the Poro prism 322 is developed so that the finder optical axes A21, A22, A23, and A24 extending from the incident plane 322a to the emergent plane 322e are shown as a straight line, on the basis of a state in which the Poro prism 322 is viewed from the same direction as FIG. 13. The right side of FIG. 15 is an optical path chart, in which the Poro prism 322 is developed so that the finder optical axes A21, A22, A23, and A24 extending from the incident plane 322a to the emergent plane 322e are shown as a straight line, on the basis of a state in which the Poro prism 322 is viewed from the same direction as FIG. 14.

The condenser lens 381 is disposed coaxially with the photometry optical axis A31 at a position which is separated from the emergent plane 322e by 2.29 mm on the photometry optical axis A31, in such a manner that the convex plane of the condenser lens 381 faces the Poro prism 322. This condenser lens 381 is provided for converging the light beam radiated from the emergent plane 322e of the Poro prism 322 onto the photometry sensor 382. The convex plane, i.e., the incident plane of the condenser lens 381 has an aspherical surface represented by the following formula (3).

$$X = C \cdot r^2/(1+(1-(K+1) \cdot C^2 \cdot Y^2)^{1/2}) + A4 \cdot Y^4 + A6 \cdot Y^6 + A8 \cdot Y^8 \qquad (3)$$

wherein

X: sag from contact plane

C: curvature of asphere

Y: height from optical axis of asphere

K=−0.47: constant of the cone

A4=−5.9×10$^{-4}$: aspheric coefficient

A6=1.06×10$^{-5}$: aspheric coefficient

A8=−7.6×10−7: aspheric coefficient

The thickness of the condenser lens 381 along the photometry optical axis A31 is 2.500 mm.

The photometry sensor 382 is disposed at a position separated by 4.910 mm from the emergent plane of the condenser lens 381 along the photometry optical axis A31, so that the light beam converged by the condenser lens 381 is received to sense the brightness of the focusing glass 326. Namely, the photometry sensor 382 is disposed in an area which is offset in the advance direction of the incident light beam entering the third reflecting plane 322d, in comparison with an area of the emergent plane 322e of the Poro prism 322, through which the light beam enters the first optical system 323.

The light receiving surface of the photometry sensor 382 faces the condenser lens 381, and is covered with a cover glass which is a parallel plane plate. A photocurrent corresponding to the amount of light received by the light receiving surface of the photometry sensor 382 is outputted from the photometry sensor 382 to the exposure control circuit 332.

The above described lens data of the photometry optical system, which is the optical system from the emergent plane 322e of the Poro prism 322 to the light receiving surface of the photometry sensor 382 along the photometry optical axis A31, is shown in the following table. Note that, in the following table, "No." implies the number of each of plane counted with the emergent plane 322e of the Poro prism 322 being No. 100. More precisely, "No. 100" implies the focusing plane 326b, "No. 101" and "No. 102" imply the incident plane and the emergent plane of the condenser lens 381. "r" implies a radius of curvature of each of the planes. "d" implies a distance from the present plane to the next plane on the optical axis. "n" implies the index of refraction of the material from the present plane to the next plane with respect to the d-line, and the index of refraction of air is omitted.

| No. | r | d | n |
|---|---|---|---|
| 100 | ∞ | 2.290 | |
| 101 | 3.940 | 2.500 | 1.58547 |
| 102 | ∞ | 4.910 | |

-continued

| No. | r | d | n |
|-----|---|-------|---------|
| 103 | ∞ | 1.600 | 1.51633 |
| 104 | ∞ | 0.000 |         |

In the photographing operation, as shown in FIG. 15, a part of a light beam radiated by the focusing glass 326 advances along the photometry optical axis A31 in the Poro prism 322, and is emerged from a part of the emergent plane 322e, the part being offset to a side of the edge 322f. The emerged light beam enters the condenser lens 381 along the photometry optical axis A31, and is converged on the photometry sensor 382 through the condenser lens 381. Therefore, a photocurrent corresponding to the luminance of the whole of the focusing plane flows in the photometry sensor 382.

Figure 9:
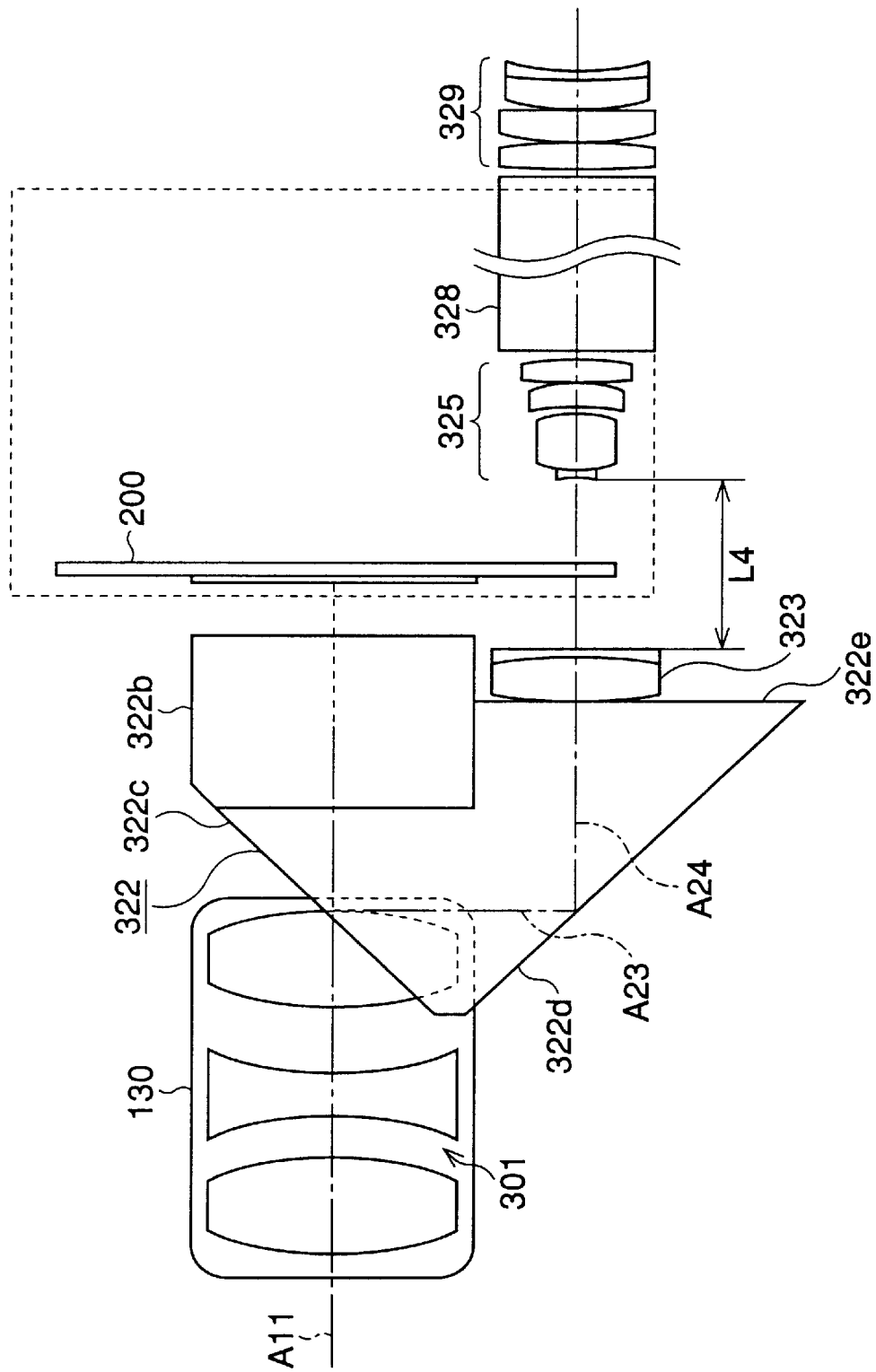
FIG. 9 is a plan view showing the optical system shown in FIG. 7.

As described above, in the Poro prism 322, in comparison with a conventional Poro prism which is a column member having a polygonal cross section and the center of which is coincide with the finder optical axis, the third reflecting plane 322d and the emergent plane 322e are extended in a direction to separate from the finder optical axis A24, as understood from a comparison of FIG. 9 and 14, so that a space through which the photometry optical axis A31 passes is formed beside the optical path passing through the first optical system 323. Therefore, without largely enlarging the Poro prism 322, and only with enlarging a part of the Poro prism 322, the photometry optical system including the condenser lens 381 and the photometry sensor 382 can be disposed beside the first optical system 323.

Note that, although the offset amount D of the photometry optical axis A31 relative to the finder optical axis A24 is 18.40 mm in the third embodiment, this offset amount D can be freely set preferably within 10<D<25 [mm]. If the offset amount D is smaller than 10 mm, the condenser lens 381 and the photometry sensor 382 may be in contact with the first optical system 323, or may interfere with the optical path passing through the first optical system 323. Conversely, if the offset amount D is larger than 25 mm, the condenser lens 381 and the photometry sensor 382 may be positioned far from the fourth finder optical axis A24, and thus the Poro prism 322 may become too large.

Note that, when D=10, angle θ, at which the photometry optical axis A31 crosses the straight line normal to the emergent plane 322e, must be approximately 10° according to formula (2). When D=20, the angle θ, at which the photometry optical axis A31 crosses the straight line normal to the emergent plane 322e, must be approximately 23° according to formula (2). Therefore, the preferable range of the value of θ is 10<θ<23 [deg]. If the center-weighted measuring is not adopted, θ can have any value as far as the photometry optical axis A31 crosses the focusing plane 326b.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. HEI 8-131049 (filed on Apr. 26, 1996), HEI 9-2352 (filed on Jan. 9, 1997), and HEI 9-2353 (filed on Jan. 9, 1997), which are expressly incorporated herein, by reference, in their entirety.

What is claimed is:

1. A view finder device provided in a camera using an electro-developing recording medium, an object image being electronically developed on said electro-developing recording medium, said electro-developing recording medium having a plurality of recording areas for recording images of the object and being movable along a surface thereof, said device comprising:

a view finder optical system provided with a passage through which said electro-developing recording medium passes, said passage extending in a direction approximately perpendicular to an optical axis of said view finder optical system and being positioned such that when an image is developed in one of the plurality of recording areas of the electro-developing recording medium, another one of the plurality of recording areas of the electro-developing recording medium can enter said passage.

2. A device according to claim 1, wherein said view finder optical system comprises a prism having an emergent plane, a first optical system facing said emergent plane, a relay optical system, which shifts an eye point of said view finder in a direction so as to separate from said first optical system, facing said first optical system, and a second optical system through which said object image obtained by said relay optical system is observed.

3. A device according to claim 2, wherein said recording medium passage is formed between said first optical system and said relay optical system.

4. A device according to claim 2, wherein said first optical system is provided proximate said emergent plane.

5. A device according to claim 2, further comprising a focusing glass on which an object image formed by a photographing optical system of said camera is formed, said focusing glass being provided close to an incident plane of said prism, a peripheral portion of said focusing glass being positioned approximately on a plane extending from an emergent plane of said first optical system.

6. A device according claim 1, wherein said electro-developing recording medium are supported by a recording medium holding frame, which can move through said recording medium passage.

* * * * *

UNITED STATES PATENT AND TRADEMARK OFFICE
CERTIFICATE OF CORRECTION

PATENT NO.    : 6,137,963
DATED         : October 24, 2000
INVENTOR(S)   : T. Morisawa et al.

It is certified that error appears in the above-identified patent and that said Letters Patent is hereby corrected as shown below:

<u>Title page,</u>
Item [75], Inventors, after "Hokkaido;" delete "Tetsuya Abe; Takayuki Sensui, both of Tokyo,".

Signed and Sealed this

Twenty-fifth Day of September, 2001

Attest:

NICHOLAS P. GODICI
*Attesting Officer*    *Acting Director of the United States Patent and Trademark Office*